Patented Mar. 17, 1936

2,034,459

UNITED STATES PATENT OFFICE 2,034,459

PROCESS OF PREPARING ARYL-MERCAPTANS AND DERIVATIVES THEREOF

John Elton Cole, Wilmington, Del., assignor to E. I. du Pont de Nemours & Company, Wilmington, Del., a corporation of Delaware No Drawing. Application September 24, 1934, Serial No. 745,369

20 Claims. (Cl. 260—108)

This invention relates to o-amino-aryl-mercaptans and derivatives thereof, and more particularly to the process for the preparation of such substances. It especially relates to o-amino-aryl-mercaptans and the corresponding thioglycollic acids and salts thereof containing substituents in the aryl nucleus, and particularly the alkoxy-substituted derivatives, and their preparation from the corresponding mercapto-aryl-thiazoles.

It is known that aryl-thiazoles such as mercapto-aryl-thiazoles may be hydrolyzed to the corresponding o-amino-aryl-mercaptans with a caustic alkali. The fusion of mercapto-benzothiazole with an alkali to form o-amino-phenyl-mercaptan is described in Berichte, vol. 20, page 1790. This process is not generally applicable to the production of substituted o-amino-aryl-mercaptans from the corresponding mercapto-aryl-thiazoles on account of side reactions. For instance, when 5-ethoxy-mercapto-benzothiazole is treated by the Berichte process, the resulting product is principally 2-amino-5-oxy-thiophenol.

In U. S. Patent No. 1,954,706, granted to Herbert A. Lubs and myself, is disclosed a process for the production of substituted o-amino-aryl-mercaptans from the corresponding mercapto-aryl-thiazoles by treatment with caustic alkali solutions under controlled conditions. U. S. Patent No. 1,954,707 discloses a process especially adapted to the hydrolysis of alkoxy-mercapto-benzothiazoles, the reaction of the caustic alkali with the mercapto-aryl-thiazole being effected in the presence of sufficient water to give a molten fusion mass at the optimum temperature.

It is an object of the present invention to provide a new and improved process which is generally applicable to the hydrolysis of aryl-thiazoles and which is particularly suitable for the hydrolysis of substituted mercapto-aryl-thiazoles to the corresponding o-amino-aryl-mercaptans. Another object is the provision of a new and improved process which is especially well adapted to the production of 1-mercapto-2-amino-5-alkoxy-benzene derivatives and 1-thioglycol-2-amino-5-alkoxy-benzene derivatives from the corresponding 5-alkoxy-mercapto-benzothiazoles. A further object is to provide a process for the production of 1-thioglycol-2-amino-5-alkoxy-benzene derivatives which is simpler and more economical than processes heretofore known. A still further object is to provide a process for the production of 1-thioglycol-2-amino-5-alkoxy-benzene derivatives from 5-alkoxy-benzothiazoles in higher yields than heretofore obtainable. Other objects will appear hereinafter.

In accomplishing these objects according to the present invention, I have found that improved results may be obtained by carrying out the hydrolysis of the aryl-thiazole in a non-aqueous medium. The reaction is preferably effected by heating together substantially water-free caustic soda, the aryl-thiazole, and a substantially inert, water-immiscible liquid such as, for example, an aromatic hydrocarbon or a halogenated aromatic hydrocarbon, in sufficient amount to give a molten fusion mass at the optimum temperature of operation. When hydrolysis is complete, the diluent may be separated, preferably by steam-distillation, and the residue neutralized. The resultant o-amino-aryl-mercaptan is converted to the alkali metal thioglycollic acid salt by treatment with an alkali metal chloro-acetate.

The process of the invention is especially desirable for the hydrolysis of substituted mercapto-benzothiazoles such as 5-alkoxy-mercapto-benzothiazoles. The preferred method consists in treating a para-alkoxy-aniline with sulfur and carbon bisulfide at elevated temperatures and pressures, thereafter mixing the crude product with caustic soda and the diluent, and heating to suitable temperatures for hydrolysis. The resulting product is then converted to the thioglycollic acid derivative as described above. The reactions involved may be typified by the following equations, where R represents an alkyl group:

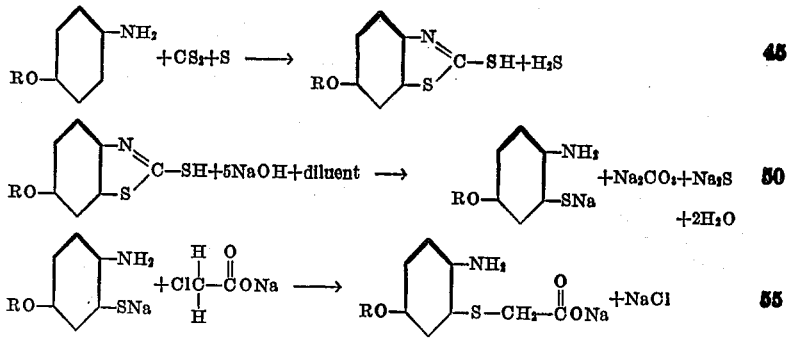

and improved process which is especially well adapted to the production of 1-mercapto-2-amino-5-alkoxy-benzene derivatives and 1-thioglycollic It will be recognized that the reactions are essentially the same as those represented in U. S. Patents Nos. 1,954,706 and 1,954,707, the important distinction being in the more efficient utilization of the alkali and the higher yields obtainable by carrying out the reaction without initially introducing water into the reaction zone.

The invention will be further illustrated, but is not limited, by the following examples, in which the quantities are stated in parts by weight.

*Example I*

Sixteen (16) parts of mercapto-benzothiazole were suspended in 25 parts of o-dichlorobenzene and 40 parts of flaked NaOH. This mixture was heated in a closed iron container and agitated at 180° C. for six hours. After this heating period was completed, the o-dichlorobenzene was removed by steam. The residue was neutralized with hydrochloric acid until it reacted only faintly alakaline to phenolphthalein. It was then cooled and treated with a solution of sodium chloro-acetate from 10 parts of chloro-acetic acid. When a test indicated there was no longer any o-amino-thiophenol present, the mixture was cooled to 0° C. and saturated with salt. The o-amino-phenyl-thioglycollic sodium salt was separated by filtration and washed with saturated salt solution. The yield and quality of the product were better than those in a similar experiment in which no o-dichlorobenzene was used.

*Example II*

In a manner similar to Example I, the following mercapto-benzothiazoles were converted to the corresponding o-amino-phenyl-thioglycollic acids:

| Mercapto-benzothiazole | o-amino-phenyl-thioglycollic acid |
| --- | --- |
| 1-mercapto-5-ethoxy-benzothiazole | 2-amino-5-ethoxy-phenyl-thioglycollic acid |
| 1-mercapto-5-methoxy-benzothiazole | 2-amino-5-methoxy-phenyl-thioglycollic acid |
| 1-mercapto-3-methyl-bentothiazole | 2-amino-3-methyl-phenyl-thioglycollic acid |
| 1-mercapto-5-methyl-benzothiazole | 2-amino-5-methyl-phenyl-thioglycollic acid. |

Good results were obtained in every case

*Example III*

Two hundred (200) parts of the crude reaction product obtained by reacting 1 mole of para-phenetidine, 1 mole of sulfur and 1.2 moles of carbon disulfide at 190° to 195° C. for four hours, were mixed with 400 parts of flaked sodium hydroxide and 125 parts of o-dichlorobenzene. The resulting product was isolated and converted to the thioglycollic acid in the manner already described in Example I. A good yield of 2-amino-5-ethoxy-phenyl-thioglycollic acid was obtained.

The invention is generally applicable to the treatment of mercapto-aryl-thiazoles, including mercapto-naphtho-thiazoles, as well as mercapto-benzothiazoles. As already stated, it is very advantageous for the hydrolysis of mercapto-aryl-thiazoles which are substituted in the aryl nucleus, for example, with alkyl (methyl, ethyl, butyl, hexyl, lauryl, etc.), alkoxy, (methoxy, ethoxy, isoproplyoxy, butyloxy, hexyloxy, lauryl-oxy, etc.), halogen (chlorine, bromine, fluorine) and/or aralkyl radicals.

The choice of the diluent depends somewhat on the reaction conditions optimum for the particular mercapto-benzothiazole involved but, in general, it may be said that the diluent should not react with strong caustic or the thiazole body at the temperature of the reaction to produce deleterious by-products and, preferably, it should have a comparatively low vapor tension under the conditions of the reaction. It is also desirable that whatever diluent is chosen should be easily recoverable so that the final product will not be contaminated by it. The diluent which has been found to be especially desirable for this purpose is commercial o-dichlorobenzene, because its vapor pressure at 160° to 200° C. is low and because it is easily and almost quantitively recoverable by steam-distillation. Other compounds might be used, for instance, benzene, toluene, xylene, naphthalene and the chlorinated derivatives of these such as chlorobenzene, para-dichlorobenzene, ortho-, meta- and para-chlorotoluenes, ortho-, meta- and para-chloroxylenes, etc. By commercial o-dichlorobenzene is meant the by-product from the commercial manufacture of monochlorobenzene and para-dichlorobenzene by chlorination of benzene. It probably contains as impurities some monochlorobenzene, para-dichlorobenzene and traces of trichlorobenzene. From academic considerations, it might be desirable to use the pure o-dichlorobenzene but from economic considerations the crude product is advantageous. The presence of phenolic bodies formed in small amounts during the hydrolysis apparently has no deleterious effect.

The temperatures of hydrolysis are subject to variations depending upon the particular thiazole body treated, but normally temperatures within the range of about 165° C. to about 210° C. may be employed. Temperatures between about 180° C. and about 200° C. are usually preferred.

The temperature used in the treatment of the reaction products with the chloro-acetate is also variable, but temperatures between 0° C. and 50° C. will usually be found to be most desirable.

The amount of caustic employed may be varied within relatively wide limits. Ordinarily, it will be found to be most desirable to employ about 5 to about 20 moles of caustic soda per mole of the mercapto-aryl-thiazole.

The amount of the diluent is subject to variation but, as previously indicated, should be sufficient to render the mass fluid at the temperature of operation. Usually, about 0.5 part to about 4.0 parts of non-aqueous diluent per part of sodium hydroxide will be found to be sufficient. The optimum amount for a well-stirred reaction vessel is ordinarily lower than for a poorly agitated one.

The pressure during the hydrolysis may be atmospheric or super-atmospheric. Super-atmospheric pressures, for example, the autogenous pressure developed when the reaction is carried out in a closed vessel or autoclave, are usually preferable. Foaming and loss of the diluent are avoided by operation under super-atmospheric pressure. To operate the process under atmospheric pressure, e. g., by refluxing, may be desirable in some instances, particularly due to the cooling effect of the refluxing diluent.

By a "non-aqueous diluent" it is intended to cover diluents which are free from water. Thus, the expression does not cover commercial ethyl alcohol which, although referred to as "alcohol", normally contains about 5% water. In other words, the invention contemplates the use of caustic in a more concentrated form than is possible where water is added to the reaction zone with the caustic alkali diluent or in any other manner from an external source. The removal of the relatively small amount of water inevitably formed during the reaction would be desirable but, ordinarily, is not practicable.

The process of the invention permits the hydrolysis reaction to proceed without the side reactions characterizing the Berichte (loc. cit.) process. It produces higher yields than obtainable by processes in which water is initially present in the reaction zone, as disclosed, for example, in U. S. Patent No. 1,954,706 and No. 1,954,707. Higher yields than heretofore may be obtained for the same amount of caustic originally introduced into the reaction zone; hence, the utilization of the caustic is more efficient and the amount which it is necessary to recover is less. As a result, the present process is more economical to operate. Furthermore, the discovery is very valuable from an operating point of view because the fusion masses are very fluid and easy to control. The use of water-immiscible diluents permits their easy removal from the reaction without decomposing the desired products.

As many apparent and widely different embodiments of this invention may be made without departing from the spirit and scope thereof, it is to be understood that I do not limit myself to the specific embodiments thereof except as defined in the appended claims.

1. In a process of hydrolyzing a mercapto-aryl-thiazole, the step which comprises heating the mercapto-aryl-thiazole with caustic alkali in a substantially inert, non-aqueous, organic diluent whereby the reaction mixture is initially substantially free from water and molten at the temperature of operation.

2. In a process of hydrolyzing a mercapto-aryl-thiazole, the step which comprises heating the mercapto-aryl-thiazole with caustic soda in a substantially inert, non-aqueous, water-immiscible, organic diluent whereby the reaction mixture is initially substantially free from water and molten at the temperature of operation.

3. In a process of hydrolyzing an alkoxy-substituted mercapto-aryl-thiazole, the step which comprises heating the alkoxy-substituted mercapto-aryl-thiazole with caustic soda in a substantially inert, non-aqueous, water-immiscible, organic diluent whereby the reaction mixture is initially substantially free from water and molten at the temperature of operation.

4. In a process of hydrolyzing a mercapto-aryl-thiazole, the step which comprises heating the mercapto-aryl-thiazole with caustic alkali to a temperature within the range of 165° C. to 210° C., in a substantially inert, non-aqueous, water-immiscible, organic diluent whereby the reaction mixture is initially substantially free from water and molten at the temperature of operation.

5. In a process of hydrolyzing an alkoxy-substituted mercapto-aryl-thiazole, the step which comprises heating the alkoxy-substituted mercapto-aryl-thiazole with caustic soda to a temperature within the range of 165° C. to 210° C. in a substantially inert, non-aqueous, water-immiscible, organic diluent whereby the reaction mixture is initially substantially free from water and molten at the temperature of operation.

6. In a process of hydrolyzing an alkoxy-substituted mercapto-aryl-thiazole, the step which comprises heating the alkoxy-substituted mercapto-aryl-thiazole with caustic soda to a temperature within the range of about 180° C. to about 200° C. in a substantially inert, non-aqueous, water-immiscible, organic diluent whereby the reaction mixture is initially substantially free from water and molten at the temperature of operation.

7. In a process of hydrolyzing a mercapto-aryl-thiazole, the step which comprises heating the mercapto-aryl-thiazole with caustic soda in a substantially inert, non-aqueous, water-immiscible, organic diluent which is liquid under the conditions of reaction.

8. In a process of hydrolyzing a mercapto-aryl-thiazole, the step which comprises heating the mercapto-aryl-thiazole with caustic soda to a temperature within the range of about 165° C. to about 210° C. in a substantially inert, non-aqueous, water-immiscible, organic diluent which is liquid under the conditions of reaction.

9. In a process of hydrolyzing a mercapto-aryl-thiazole, the step which comprises heating the mercapto-aryl-thiazole with caustic soda in an aromatic hydrocarbon which is liquid under the conditions of reaction.

10. In a process of hydrolyzing a mercapto-aryl-thiazole, the step which comprises heating the mercapto-aryl-thiazole with caustic soda in a ring-halogenated aromatic hydrocarbon which is liquid under the conditions of reaction.

11. In a process of hydrolyzing a 5-alkoxy-mercapto-benzothiazole, the step which comprises heating the 5-alkoxy-mercapto-benzothiazole with substantially water-free sodium hydroxide in a substantially inert, non-aqueous, organic diluent.

12. In a process of hydrolyzing a 5-alkoxy-mercapto-benzothiazole, the step which comprises heating the 5-alkoxy-mercapto-benzothiazole with sodium hydroxide in a substantially inert, non-aqueous, water-immiscible, organic solvent.

13. In a process of hydrolyzing a 5-alkoxy-mercapto-benzothiazole, the step which comprises heating the 5-alkoxy-mercapto-benzothiazole with sodium hydroxide in a substantially inert, non-aqueous, water-immiscible, organic diluent at a temperature from about 165° C. to about 210° C.

14. In a process of hydrolyzing 5-ethoxy-mercapto-benzothiazole, the step which comprises heating 5-ethoxy-mercapto-benzothiazole with sodium hydroxide in a substantially inert, non-aqueous, water-immiscible, organic diluent.

15. In a process of hydrolyzing 5-ethoxy-mercapto-benzothiazole, the step which comprises heating 5-ethoxy-mercapto-benzothiazole with sodium hydroxide in a substantially inert, non-aqueous, water-immiscible, organic diluent at a temperature within the range of about 180° C. to about 210° C.

16. In a process of hydrolyzing 5-ethoxy-mercapto-benzothiazole, the step which comprises heating 5-ethoxy-mercapto-benzothiazole with sodium hydroxide in an aromatic hydrocarbon of the benzene series at a temperature from about 180° C. to about 200° C.

17. In a process of hydrolyzing 5-ethoxy-mercapto-benzothiazole, the step which comprises heating 5-ethoxy-mercapto-benzothiazole with sodium hydroxide in a ring-halogenated aromatic hydrocarbon of the benzene series at a temperature from about 180° C. to about 200° C.

18. In a process of hydrolyzing 5-ethoxy-mercapto-benzothiazole, the step which comprises heating 5-ethoxy-mercapto-benzothiazole with sodium hydroxide in ortho-dichlorobenzene at a temperature from about 180° C. to about 200° C.

19. A process of preparing a 1-thioglycol-2-amino-5-alkoxy-benzene which comprises heating para-phenetidine with carbon disulfide and sulfur at elevated temperatures and pressures until reaction is complete, heating the reaction product at about 180° C. to about 200° C. with caustic soda in a water-immiscible, non-aqueous, substantially inert, organic diluent, steam-distilling off the diluent after the completion of the heating period, neutralizing the residue, and then treating it with sodium chloro-acetate at about 0° C. to about 50° C.

20. A process of preparing 1-thioglycol-2-amino-5-ethoxy-benzene which comprises heating para-phenetidine with carbon disulfide and sulfur at elevated temperatures and pressures until reaction is complete, heating the reaction product at about 180° C. to about 200° C. with caustic soda in ortho-dichlorobenzene, steam-distilling off the ortho-dichlorobenzene after the completion of the heating period, neutralizing the residue, and then treating it with sodium chloro-acetate at about 0° C. to about 50° C.

JOHN ELTON COLE.